UNITED STATES PATENT OFFICE.

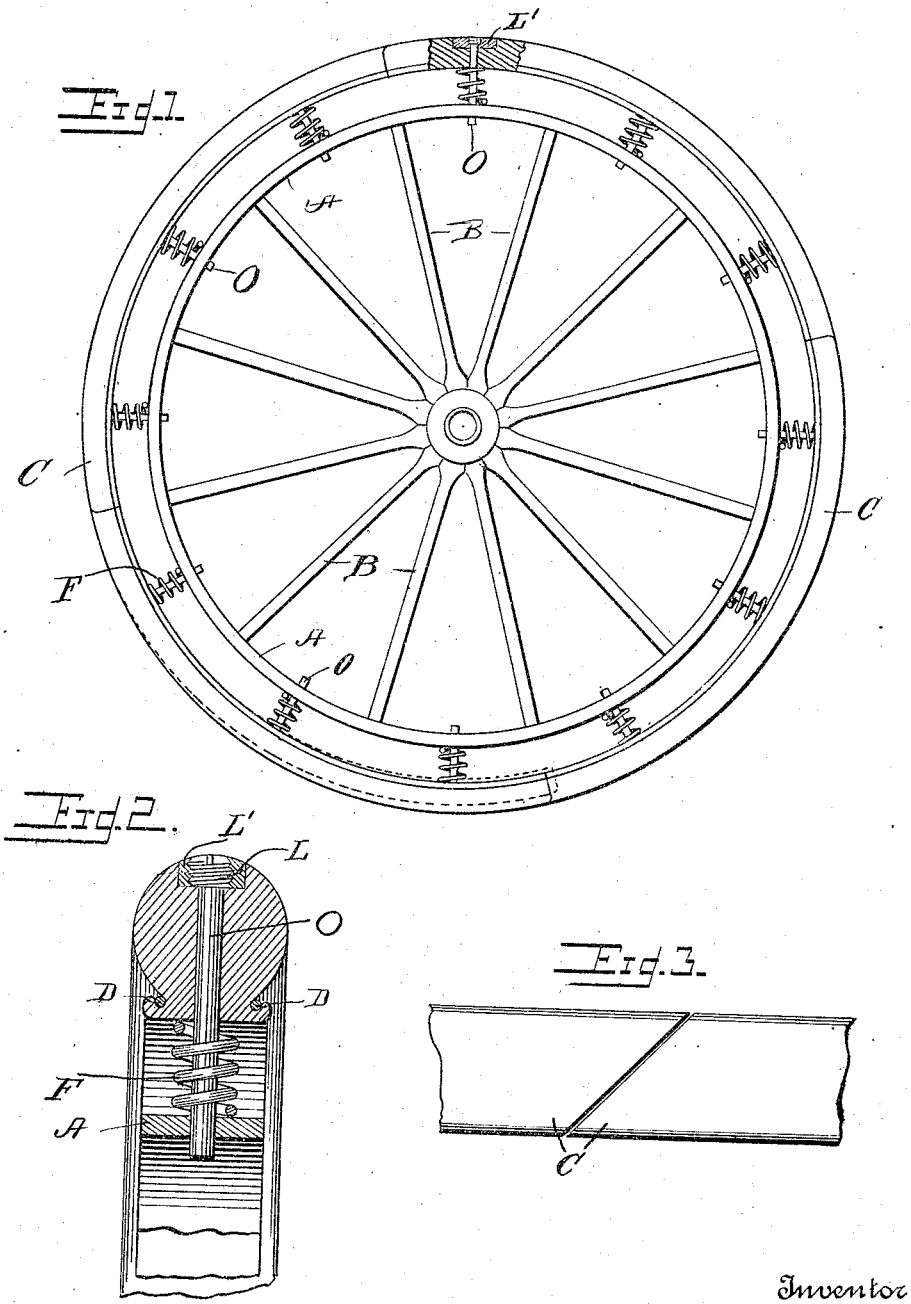

BERNARD HARRY BERRY, OF HELENA, MONTANA.

RESILIENT WHEEL.

1,299,898.     Specification of Letters Patent.     Patented Apr. 8, 1919.

Application filed April 1, 1918. Serial No. 225,990.

*To all whom it may concern:*

Be it known that I, BERNARD H. BERRY, a citizen of the United States, residing at Helena, in the county of Lewis and Clark and State of Montana, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels and consists essentially in the provision of a sectional tire mounted so as to be resilient about the rim of the wheel and designed to take the place of the pneumatic tire.

The invention consists of various details of construction, combinations and arrangements of parts which will be hereinafter fully described, shown in the accompanying drawings and then specifically defined in the appended claim.

I illustrate my invention in the accompanying drawings which, with the letters of reference marked thereon, form a part of this specification and in which:

Figure 1 is a view in elevation of a wheel partly in section.

Fig. 2 is a cross sectional view through the tire and rim, parts being shown in elevation.

Fig. 3 is a plan view showing overlapping sections of the tire.

Reference now being had to the details of the drawings by letter:

A designates the rim of a wheel having spokes B, and C is a tire made up of sections, the ends of which are inclined and overlap each other as shown in Fig. 3 of the drawings. The tire is held in place by rings D in the usual manner. O designates pins, the outer ends of which have threaded heads L' which engage threaded socket members L' fitted in recesses in the tread surface of the tire. Said pins pass through the tire and through the rim A. Coiled springs F are mounted upon said pins intermediate the rim and the sections of the tire and tend to normally hold the latter in the position shown in solid lines in Fig. 1, the sections yielding against the tension of the springs under the weight upon the wheel.

By the provision of a resilient tire made in accordance with my invention, it will be noted that vibrations will be taken up and practically the same effect produced as with pneumatic tires.

What I claim to be new is:

A resilient wheel having a rim with apertures therein one intermediate each pair of spokes, a tire with apertures therein in alinement with the apertures in said rim, and each aperture in the tire having a recess about the same, a socket member fitted within each recess, and having a central opening the wall of which is threaded, a pin provided with a head the circumference of which is threaded and adapted to engage the threaded wall of the socket member, the inner end of the head engaging the bottom of the recess, said pin passing through registering apertures in the tire and rim, and a coiled spring upon the pin intermediate the rim and said tire.

In testimony whereof I hereunto affix my signature in presence of two witnesses.

BERNARD HARRY BERRY.

Witnesses:
  LUTHER T. HAUBERG,
  OTTO SCHWENK.

Copies of this patent may be obtained for five cents each, by addressing the "Commissioner of Patents, Washington, D. C."